(12) United States Patent
Lin

(10) Patent No.: US 12,727,581 B1
(45) Date of Patent: Sep. 8, 2026

(54) MULTI-FUNCTIONAL PET HARNESS WITH STORAGE BAG

(71) Applicant: Wenzhou Double Star Pet Products Manufactory, Wenzhou (CN)

(72) Inventor: Zhaodi Lin, Wenzhou (CN)

(73) Assignee: Wenzhou Double Star Pet Products Manufactory, Wenzhou (CN)

( * ) Notice: Subject to any disclaimer, the term of this patent is extended or adjusted under 35 U.S.C. 154(b) by 11 days.

(21) Appl. No.: 19/241,247

(22) Filed: Jun. 17, 2025

(51) Int. Cl.
*A01K 27/00* (2006.01)

(52) U.S. Cl.
CPC .......... *A01K 27/002* (2013.01); *A01K 27/006* (2013.01); *A01K 27/008* (2013.01)

(58) Field of Classification Search
CPC ........ A01K 27/002–009; A01K 15/022; A01K 15/023; A01K 15/029
See application file for complete search history.

(56) References Cited

U.S. PATENT DOCUMENTS 5,887,772 A * 3/1999 Dooley ................ A01K 27/008 119/858
D908,981 S * 1/2021 Guo ............................ D30/152
D974,675 S * 1/2023 Huang ......................... D30/145
D1,101,299 S * 11/2025 Lyu ............................. D30/152
D1,101,307 S * 11/2025 Pan ............................. D30/152
2022/0142124 A1* 5/2022 Stevens ................ A01K 27/002

FOREIGN PATENT DOCUMENTS

CA 1261908 A * 9/1989 ............... A61D 9/00
CA 3128565 A1 * 9/2020 ........... A01K 27/002
WO WO-2024186979 A2 * 9/2024 .......... A01K 27/008

* cited by examiner

*Primary Examiner* — Ebony E Evans
(74) *Attorney, Agent, or Firm* — Birchwood IP

(57) ABSTRACT

An adjustable pet harness is provided, which includes an abdominal pad; one end of the abdominal pad is provided with a first woven belt with an insertion buckle, the other end of the abdominal pad is provided with a second woven belt with an embedding buckle, a top of a back pad is connected to a fourth woven belt with a sleeve buckle; which significantly enhances wearing convenience and abandon a traditional head fitting manner, a new mode of wearing from the neck is achieved by setting embedding buckle and sleeve buckle on one side of the neck. For pets with sensitive or injured heads, the discomfort and resistance caused by the fitting are avoided, rendering it easier and simpler for owners to operate, the chest, back, and neck can be fully opened, which can quickly release the chest and back constraints in emergency situations.

7 Claims, 6 Drawing Sheets

MULTI-FUNCTIONAL PET HARNESS WITH STORAGE BAG

TECHNICAL FIELD

The present disclosure relates to the field of pet harness technologies, and in particular, to multi-functional pet harness with storage bag.

BACKGROUND

With the development of social economy and the improvement of people's living standards, pet keeping has become one of the lifestyles of many families, and the safety and comfort experience of pet travel are increasingly receiving attention. Pet harness is important equipment for pet travel, and the performance directly affects the quality of travel for pets and their owners.

In practical use, traditional pet harness has various problems.

In conventional designs, most pet harnesses are worn by inserting the harness over the pet's head, fixing it with straps around the neck and body, and setting a metal loop in a shape of a "D" on the back or abdomen to connect the leash. For pets with head injuries or natural sensitivity to head restraints, this method is prone to pet resistance, difficult to operate, and difficult to quickly release chest and back restraints in emergency situations.

In terms of identity identification placement, pet ID tags are usually directly hung on collars or harness, which are not only easy to fall off, but also exposed to the outside, and the information is easily blurred due to pet play or external friction, rendering it inconvenient to view.

In terms of safety sign design, although some harness has reflective designs, the distribution of reflective strips is not comprehensive enough. In nighttime or low light environments, it is difficult to fully improve the visibility of pets and ensure the safety of pets and their owners during travel.

In terms of wearing comfort, existing harness fabrics are difficult to balance breathability and warmth, which cannot meet the temperature regulation needs of pets in different seasons.

In terms of controlling pet behavior, traditional harness lacks effective mechanical design and behavior guidance structures. When pets exhibit pulling behavior during traction, it is difficult to accurately control them and effectively guide them to correct bad behavior.

SUMMARY

The purpose of the present disclosure is to provide an adjustable pet harness to solve problems of inconvenient wearing, poor control effect, insufficient safety signs, unreasonable placement of ID tags, and poor wearing comfort of existing pet harnesses proposed in the background technology.

To achieve the above objectives, the present disclosure provides the following technical solution: an adjustable pet harness, including an abdominal pad; one end of the abdominal pad is provided with a first woven belt, two ends of the first woven belt are connected with an insertion buckle, the other end of the abdominal pad is provided with a second woven belt, and one end of the second woven belt is connected with an embedding buckle; and the adjustable pet harness further includes a back pad; a top of the back pad is connected to a fourth woven belt, and one end of the fourth woven belt is connected to a sleeve buckle; the sleeve buckle is located on an outside of the back pad and is connected to the embedding buckle to achieve limited installation near the neck of the pet while further allowing for adjustable positioning to accommodate different neck sizes or ensure a proper fit; a bottom of the back pad is sewn with suture bands on two sides, and ends of the suture bands are further connected to a sleeve, and the sleeve is engaged and connected with the insertion buckle, and with the design of the sleeve buckle and embedding buckle, it can be worn from the side during pet wearing, eliminating the cumbersome operation of fitting from the pet's head; a third woven belt is provided between the back pad and the abdominal pad.

In some embodiments of the present disclosure, a handle is sewn at a middle position of a top of the back pad, a metal loop is fixedly provided on a top surface of the back pad, and the "D"-shaped metal loop is arranged to be adjacent to the handle. In use, a leash can be passed through the metal loop to control the traction more accurately and effectively. By dispersing the tension to the neck, chest, and shoulders, the pet's movement can be weakened due to slight discomfort when pulling; a bottom of the abdominal pad is further provided with a circular ring, which can guide the pet's body to turn towards the owner, break the forward inertia, promoting heeling behavior, and significantly strengthen the owner's ability to control the pet's behavior.

In some embodiments of the present disclosure, a bottom of the abdominal pad is provided with a plurality of first reflective strips, and a top of the back pad is provided with a plurality of second reflective strips. By setting the first reflective strips and second reflective strips, the visibility of pets at night or in low light environments can be significantly improved, enhancing safety.

In some embodiments of the present disclosure, an inner side of the back pad is further provided with a storage bag, and the storage bag has a single side opening; a Velcro is connected to an opening of the storage bag, and the Velcro is bonded to an inner side of the back pad. The storage bag with single opening can reduce the risk of the ID tags falling off. The providing of the Velcro can easily open the storage bag, and at the same time, objects such as ice packs, heat packs, and locators can be placed inside the storage bag.

In some embodiments of the present disclosure, a first elastic band is sewn on an inner side of the storage bag, and a plurality of second elastic bands are further provided in an area between the first elastic band and the storage bag, thereby forming an independent placement area between the second elastic bands and the storage bag. By dividing an interior of the storage bag into a plurality of independent placement areas, placed objects can be separated, which not only facilitates the classification of picking and placing, but also avoids the problem of accumulation of a plurality of objects between pets during running, which affects the comfort of wearing the back pad.

In some embodiments of the present disclosure, an inner wall of the first elastic band is further sewn with an integrated damping strip, a longitudinal section of an end of the damping strip is semi-circular. By setting the damping strip, it is possible to increase a friction force and improve the stability of placement when placing objects close to the area between the first elastic band and the storage bag.

In some embodiments of the present disclosure, the back pad and the abdominal pad are integrally in an I-shape, a length of the back pad is smaller than that of the abdominal pad.

In some embodiments of the present disclosure, metal adjustment buckles are provided at two ends of the first woven belt, two ends of the second woven belt, and two ends of the third woven belt; this metal adjustment buckles can adjust lengths of the first woven belt, the second woven belt, and third woven belt to accommodate pets of different body types, ensuring that the pet harness fit the pet's body without being too tight and affecting their activities; materials of the first woven belt, the second woven belt, and third woven belt are the same.

Compared with the existing technology, the beneficial effects of the present disclosure are as follows.

1. Significantly enhancing wearing convenience: abandoning the traditional head fitting manner, a new mode of wearing from the neck is achieved by setting the embedding buckle and sleeve buckle on one side of the neck. For pets with sensitive or injured heads, the discomfort and resistance caused by the head fitting are avoided, and the owner's operation is easier and simpler. At the same time, the chest, back, and neck can be fully opened. In emergency situations, the chest and back constraints can be quickly released, gaining valuable time for pets and greatly improving the convenience and emergency response capabilities of use.
2. Improved reliability of ID tags management: an invisible storage bag is added to the inner side of the back pad, and the storage bag has elasticity and sealability. The specially designed wear-resistant thread inside can firmly fix the stored items to prevent them from falling off. The concealed design can avoid scratches and wear on the stored items, ensuring clear information. At the same time, the storage bag can also be used to hang locators. The side is provided with Velcro, rendering it convenient to place cold or hot bags, meeting the needs of pet positioning, tracking, and temperature regulation. The functions are diverse and practical.
3. Precise control: the metal loop is placed above the handle, rendering traction control more precise and powerful. By dispersing the pulling force to the neck, chest, and shoulders, the pet's movement is weakened due to slight discomfort when pulling; at the same time, the circular ring at the abdominal pad can guide the pet's body to turn towards the owner, break the inertia of forward movement, promote heeling behavior, and significantly strengthen the owner's ability to control the pet's behavior.
4. Comprehensive safety upgrade: reflective strips are distributed in all directions, thereby significantly improving the visibility of pets at night or in low light environments. Multi-angle reflection of light allows passing vehicles and pedestrians to detect pets earlier, effectively reducing safety risks and providing reliable protection for nighttime travel.

Figure 1:
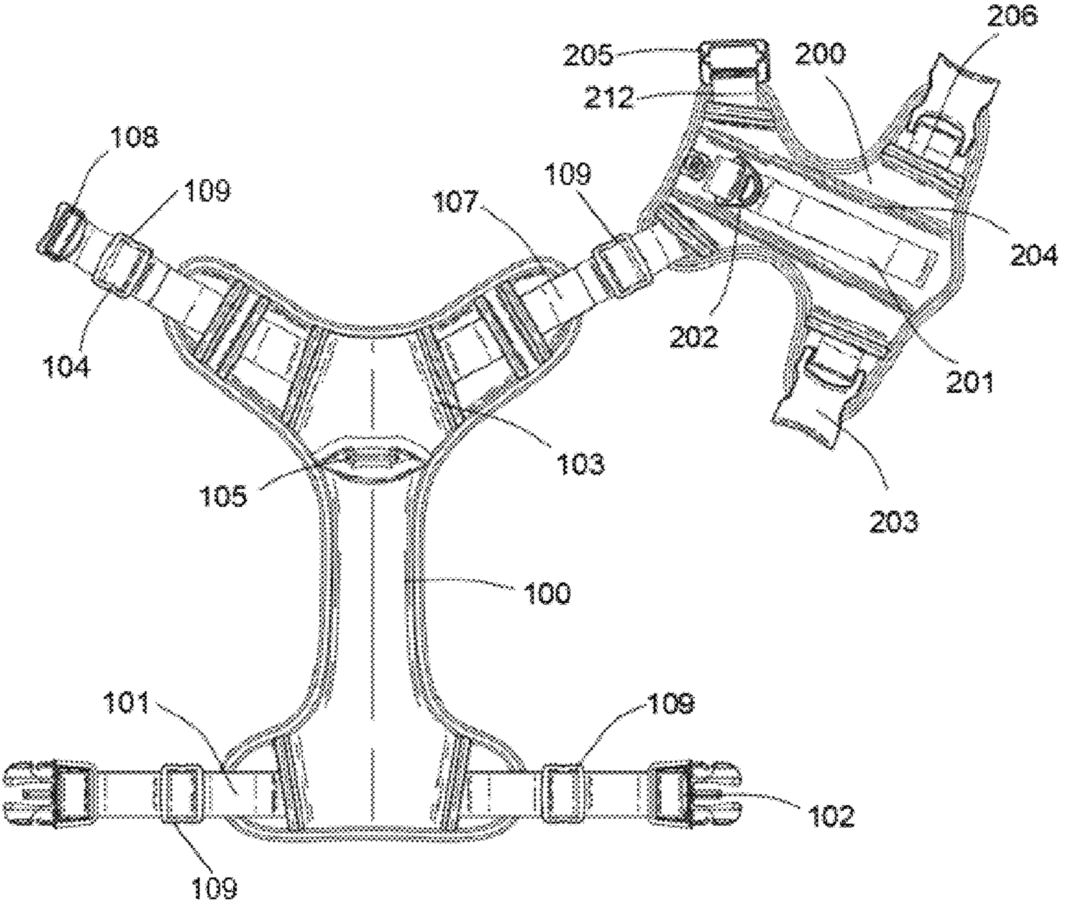
FIG. 1 is a schematic structural diagram of the present disclosure.
Figure 2:
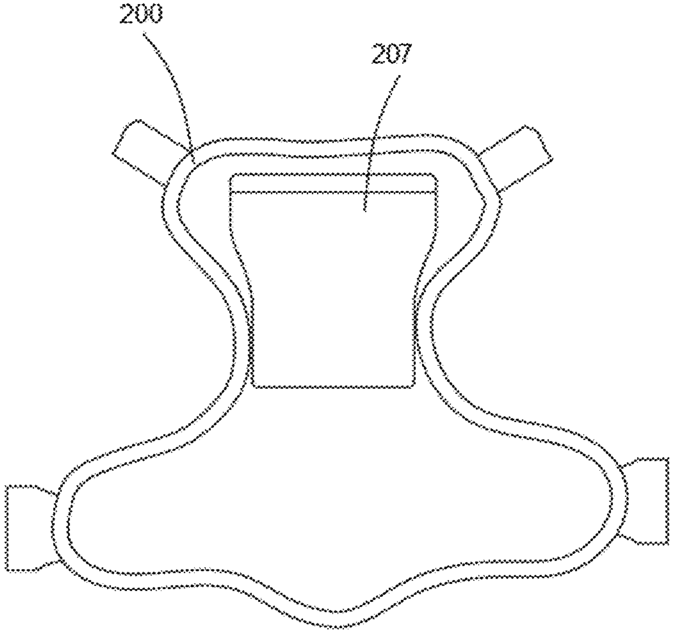
FIG. 2 is a bottom view of a back pad of the present disclosure.
Figure 3:
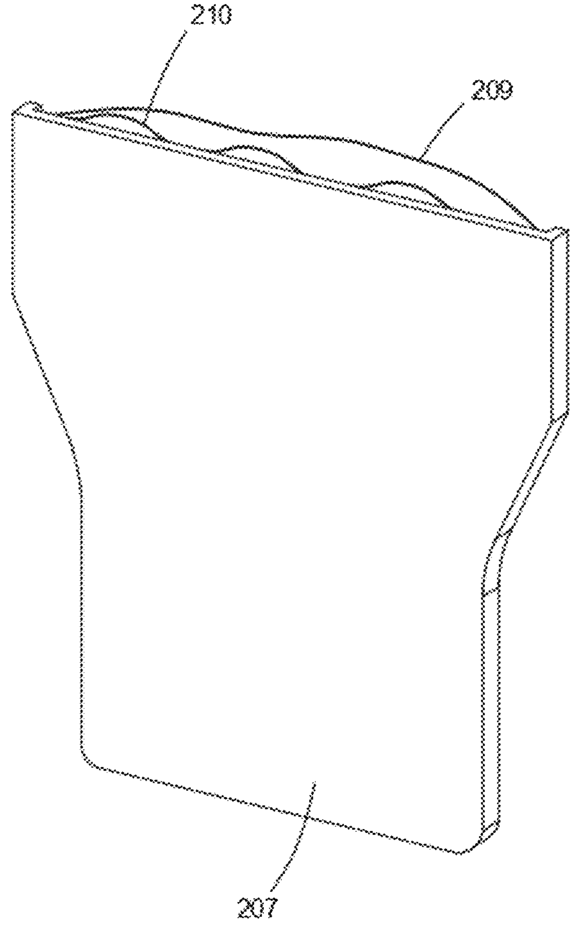
FIG. 3 is a schematic diagram of a connection between a storage bag with a first elastic band and a second elastic band of the present disclosure.
Figure 4:
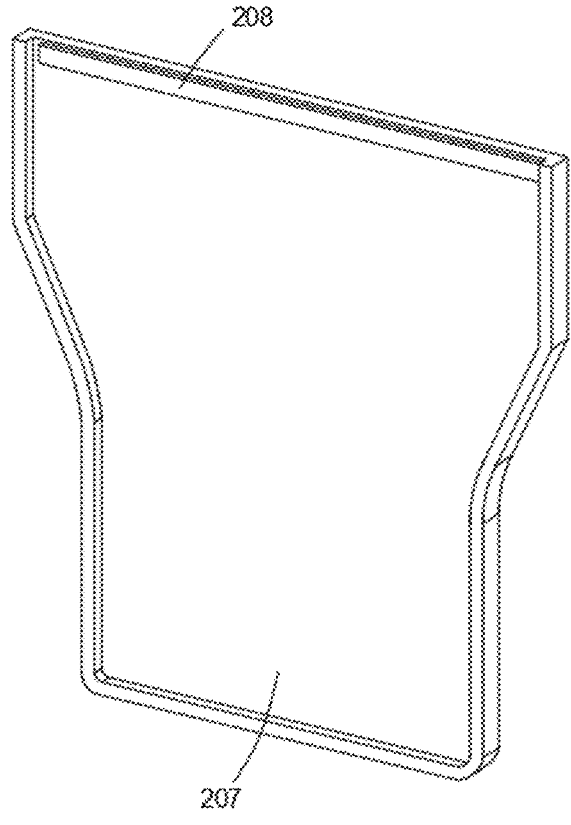
FIG. 4 is a schematic diagram of an inner side of the storage bag of the present disclosure.
Figure 5:
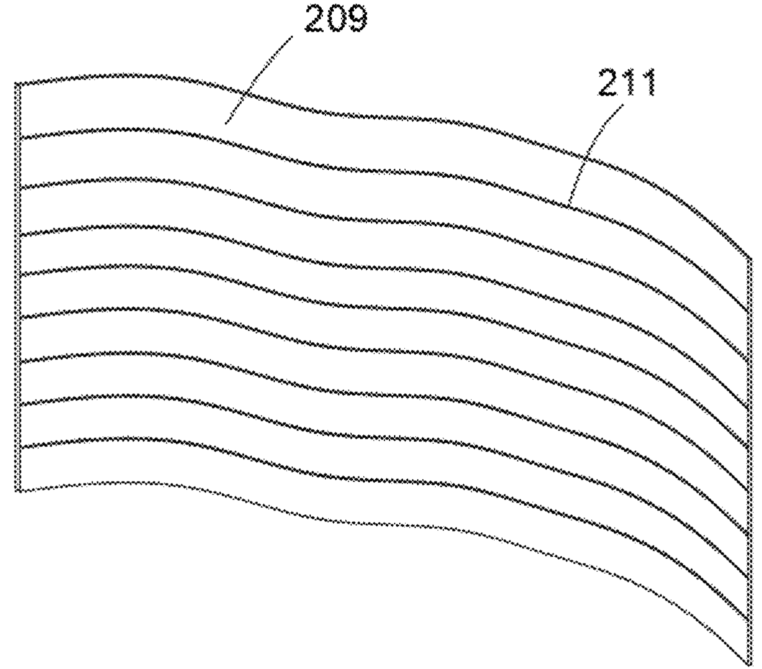
FIG. 5 is a schematic structural diagram of the first elastic band of the present disclosure.

Numeral reference: 100—abdominal pad; 101—first woven belt; 102—insertion buckle; 103—first reflective strip; 104—second woven belt; 105—circular ring; 107—third woven belt; 108—embedding buckle; 109—adjustment buckle; 200—back pad; 201—handle; 202—metal loop; 203—sleeve; 204—second reflective strip; 205—sleeve buckle; 206—suture band; 207—storage bag; 208—Velcro; 209—first elastic band; 210—second elastic band; 211—damping strip; 212—fourth woven belt.

DESCRIPTION OF EMBODIMENTS

Below, the technical solutions in the embodiments of the present disclosure will be clearly and completely described in combination with the accompanying drawings.

Obviously, the described embodiments are only a part of the embodiments of the present disclosure, not all of them. Based on the embodiments of the present disclosure, all other embodiments obtained by those skilled in the art without creative work are within the protection scope of the present disclosure.

Please refer to FIGS. 1 to 6. The present disclosure provides a technical solution: an adjustable pet harness, including:

an abdominal pad 100, one end of the abdominal pad 100 is provided with a first woven belt 101, two ends of the first woven belt 101 are connected to an insertion buckle 102, the other end of the abdominal pad 100 is provided with a second woven belt 104, one end of the second woven belt 104 is connected to an embedding buckle 108;

the adjustable pet harness further includes a back pad 200;

a top of the back pad 200 is connected to a fourth woven belt 212, and one end of the fourth woven belt 212 is connected to a sleeve buckle 205, the sleeve buckle 205 is located on an outside of the back pad 200 and is engaged with the embedding buckle 108 to achieve limited installation near the neck of the pet; a bottom of the back pad 200 is sewn with suture bands 206 on two sides, and ends of the suture bands 206 are further connected to a sleeve 203; the sleeve 203 is engaged with the insertion buckle 102, and with the design of the sleeve buckle 205 and the embedding buckle 108, it can be worn on the pet from the side, eliminating the cumbersome operation of fitting from the pet's head; there is a third woven belt 107 provided connected between the back pad 200 and the abdominal pad 100.

In an implementation mode, a top middle position of the back pad 200 is sewn with a handle 201, and a metal loop 202 is fixedly provided on a top surface of the back pad 200. The metal loop 202 is arranged to be adjacent to the handle 201. In use, a leash can be passed through the metal loop 202 to control the traction more accurately and effectively. By dispersing the tension to the neck, chest, and shoulders, the pet's movement can be weakened due to slight discomfort when pulling; a bottom of the abdominal pad 100 is further provided with a circular ring 105, which can guide the pet's body to turn towards the owner, break the forward inertia, promote heeling behavior, and significantly strengthen the owner's ability to control the pet's behavior.

In an implementation mode, a bottom of the abdominal pad 100 is provided with a plurality of first reflective strips 103, and a top of the back pad 200 is provided with a plurality of second reflective strips 204. By setting the first reflective strips 103 and second reflective strips 204, the visibility of pets at night or in low light environments can be significantly improved, and safety can be enhanced. The first reflective strips 103 and second reflective strips 204 are also provided on the handle 201 and various woven belts to increase the reflective identification area.

In an implementation mode, an inner side of the back pad 200 is further provided with a storage bag 207, and the storage bag 207 has a single side opening. A Velcro 208 is connected to an opening position of the storage bag 207, and the Velcro 208 is bonded to an inner side of the back pad 200. The storage bag 207 with single opening can reduce the risk of the ID tags falling off, and the setting of the Velcro 208 can easily open the storage bag 207. At the same time, objects such as ice packs, heat packs, and locators can also be placed inside the storage bag 207.

In an implementation mode, an inner side of the storage bag 207 is further sewn with a first elastic band 209. A plurality of second elastic band 210 are further provided in an area between the first elastic band 209 and the storage bag 207, thereby forming an independent placement area between the second elastic band 210 and the storage bag 207. By dividing an interior of the storage bag 207 into a plurality of independent placement areas, the placed objects can be separated, which not only facilitates the classification of picking up and placing, but also avoids the problem of accumulating a plurality of objects while running and affecting the comfort of wearing the back pad 200.

In an implementation mode, the inner wall of the first elastic band 209 is further sewn with an integrated damping strip 211, and a longitudinal section of one end of the damping strip 211 is semi-circular. By setting the damping strip 211, it is possible to increase a friction force and improve the stability of placement when placing objects close to the area between the first elastic band 209 and the storage bag 207.

In an implementation mode, the back pad 200 and the abdominal pad 100 are in an I-shape as a whole, with a length of the back pad 200 being smaller than that of the abdominal pad 100.

Figure 6:
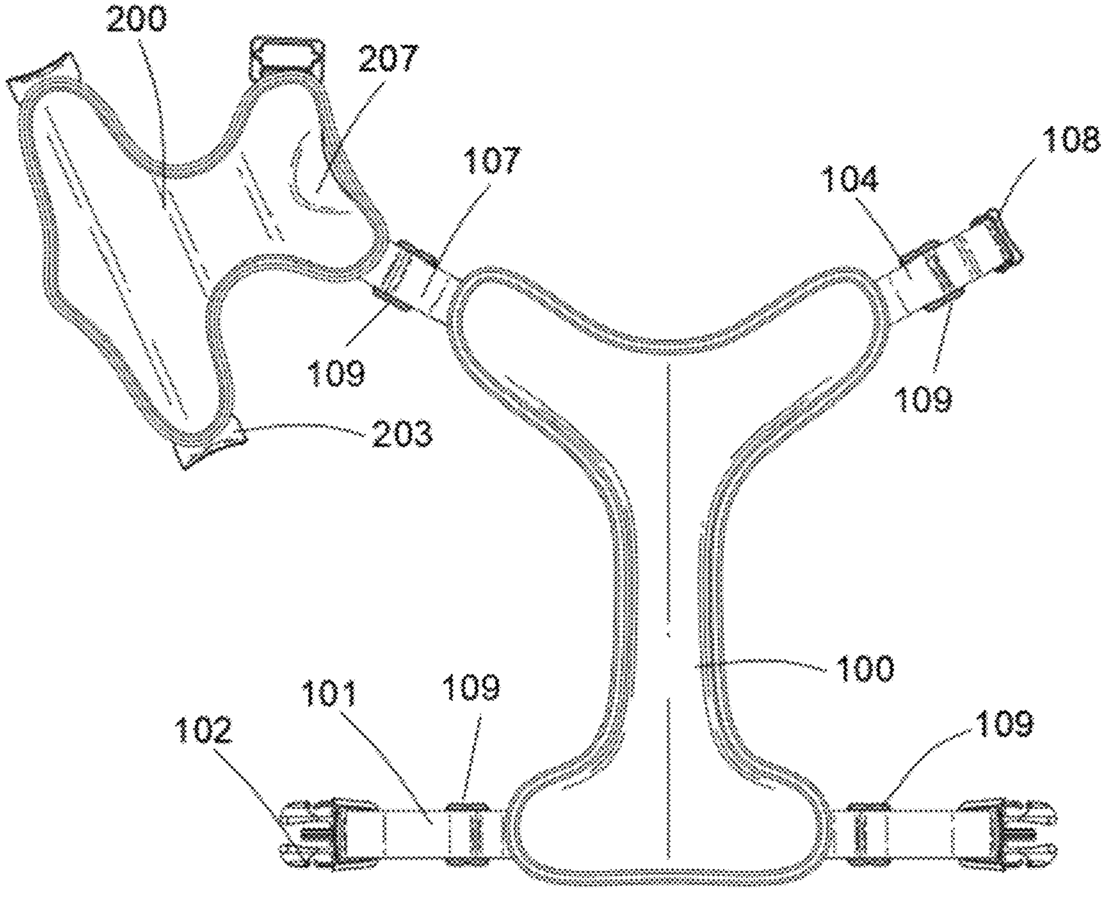
FIG. 6 is a rear view of the present disclosure.

In an implementation mode, metal adjustment buckles 109 are provided at two ends of first woven belt 101, two ends of the second woven belt 104, and two ends of third woven belt 107 (as shown in FIGS. 1 and 6). The metal adjustment buckles 109 can adjust the lengths of the second woven belt 104, third woven belt 107, and first woven belt 101 to adapt to pets of different body types, ensuring that the pet harness fit the pet's body without being too tight and affecting the pet's activities. The materials of first woven belt 101, second woven belt 104, and third woven belt 107 are the same.

In the present disclosure, the materials of the abdominal pad 100 and the back pad 200 are designed with a combination of special mesh and PP cotton. In summer, air quickly passes through the gaps between the mesh, taking away the heat from the pet's body surface, reducing stuffiness and keeping the body surface dry. Internally filled with PP cotton, it can block the heat loss of pets' bodies in winter and create a warm environment. The unique structure of PP cotton assists the outer fabric in accelerating air circulation and dissipating heat during summer. Through this design, the pet's chest and back achieve warmth in winter and coolness in summer, thereby greatly improving the comfort of pet travel and allowing pets to enjoy pleasant experiences in various environments.

Although the embodiments of the present disclosure have been shown and described (as detailed above), it will be understood by those skilled in the art that various changes, modifications, substitutions, and variations can be made to these embodiments without departing from the principles and spirit of the present disclosure. The scope of the present disclosure is limited by the appended claims and their equivalents.

What is claimed is:

1. An adjustable pet harness, comprising:

an abdominal pad; one end of the abdominal pad is provided with a first woven belt, two ends of the first woven belt are connected with an insertion buckle, the other end of the abdominal pad is provided with a second woven belt, and one end of the second woven belt is connected with an embedding buckle;

wherein the adjustable pet harness further comprises a back pad;

a top of the back pad is connected to a fourth woven belt, and one end of the fourth woven belt is connected to a sleeve buckle;

the sleeve buckle is located on an outside of the back pad and is connected to the embedding buckle through a snap fit;

a bottom of the back pad is sewn with suture bands on two sides;

ends of the suture bands are further connected to a sleeve, and the sleeve is engaged and connected with the insertion buckle;

a third woven belt is provided between the back pad and the abdominal pad;

an inner side of the back pad is further provided with a storage bag, wherein a first elastic band is sewn on an inner side of the storage bag, and a plurality of second elastic bands are further provided in an area between the first elastic band and the storage bag, thereby forming an independent placement area between the second elastic bands and the storage bag.

2. The adjustable pet harness according to claim 1, wherein a handle is sewn at a middle position of a top of the back pad;

a metal loop is fixedly provided on a top surface of the back pad, and a "D"-shaped metal loop is arranged to be adjacent to the handle;

a bottom of the abdominal pad is further provided with a circular ring.

3. The adjustable pet harness according to claim 1, wherein a bottom of the abdominal pad is provided with a plurality of first reflective strips, and a top of the back pad is provided with a plurality of second reflective strips.

4. The adjustable pet harness according to claim 1, wherein the storage bag has a single side opening;

a Velcro is connected to an opening position of the storage bag, and the Velcro is bonded to an inner side of the back pad.

5. The adjustable pet harness according to claim 1, wherein an inner wall of the first elastic band is further sewn with an integrated damping strip, a longitudinal section of an end of the damping strip is semi-circular.

6. The adjustable pet harness according to claim 1, wherein the back pad and the abdominal pad are integrally in an I-shape, a length of the back pad is smaller than that of the abdominal pad.

7. The adjustable pet harness according to claim 1, wherein metal adjustment buckles are provided at two ends of the first woven belt, two ends of the second woven belt, and two ends of the third woven belt;

materials of the first woven belt, the second woven belt, and third woven belt are the same.

* * * * *